ns Patent Office
3,265,496
Patented August 9, 1966

1

3,265,496
PHOTOCONDUCTIVE SUBSTANCES FOR
ELECTROPHOTOGRAPHY
Charles J. Fox, Rochester, N.Y., assignor to Eastman Kodak Company, Rochester, N.Y., a corporation of New Jersey
No Drawing. Filed Dec. 29, 1961, Ser. No. 163,016
14 Claims. (Cl. 96—1)

The present invention relates to electrophotography and particularly to novel photoconductive substances for use in preparing electrophotographic photoconductive layers.

Electrophotographic processes which depend on photoconductive layers include (a) xerographic processes in which, for example, a photoconductive layer on an electrically conducting support is provided with a uniform electrostatic charge in the dark, given an image exposure to light which causes the charge to be selectively dissipated in proportion to the intensity of the incident radiation, and then toned with a triboelectric powder having optical density which adheres in the areas of residual charge, and (b) photoconductographic processes in which, for example, a photoconductive layer provides in areas of image exposure sufficient conductivity to enable formation of a visible image by an electrolytic process activated by an externally applied source of electric current. Processes of these types are well known and have been described in such U.S. and foreign patents as U.S 2,297,691, 2,551,582, and British 188,030 and 464,112.

Photoconductive layers for use in processes of electrophotography have in the past been prepared using various inorganic materials such as sulfur, selenium, cadmium sulfide, zinc oxide, and the like, as well as certain organic compounds. In the copending application filed on even date herewith, certain novel polymeric and nonpolymeric compounds for use in photoconductive layers were described. It is an object of the present application to provide still other novel polymeric and nonpolymeric photoconductive substances. It is a further object to provide novel photoconductive layers for use in preparing electrophotographic materials. A still further object is to provide novel photoconductive layers for use in preparing xerographic materials.

These objects are accomplished by coating onto an electrically conducting support a photoconductive layer incorporating therein as the photoconductive substance, the reaction product of a diaryl secondary amine with an aryl halide where at least one of the reactants is polyfunctional. By polyfunctional I mean that either the amine reactant is a polyamine or the halide reactant is a polyhalide.

Typical diaryl secondary amines useful as reactants in the preparation of the photoconductor substances of the invention include, for example, Diphenylamine,
Dinaphthylamines,
N,N'-diphenyl-p-phenylenediamine,
N,N'-diphenyl-m-phenylene-diamine,
N,N'-diphenylbenzidine,
N,N'-dinaphthylbenzidine,
N,N'-diphenylbiphenyldiamines,
N,N'-dinaphthylbiphenyldiamines,
N-phenylnaphthylamines,
N,N'-diphenylnaphthalenediamines,
N-phenylanthrylamines,
N,N'-diphenylanthradiamines,
N-phenyl-fluorenamine,
N,N'-dinaphthyl-p-phenylenediamine,
N,N'-dinaphthyl-m-phenylenediamine,
Poly(phenyleneimine),
and the like.

2

Useful aryl halide reactants of the invention include aryl monohalides and aryl polyhalides. The preferred halides are the iodides, bromides and chlorides. Representative halides are iodobenzene, bromobenzene, chlorobenzene, diiodobenzenes, dibromobenzenes, dichlorobenzenes, iodobiphenyls, bromobiphenyls, chlorobiphenyls, diiodobiphenyls, dibromobiphenyls, dichlorobiphenyls, iodonaphthalenes, bromonaphthalenes, chloronaphthalenes, diiodonaphthalenes, dibromonaphthalenes, dichloronaphthalenes, iodobinaphthyls, bromobinaphthyls, chlorobinaphthyls, diiodobinaphthyls, dibromobinaphthyls, dichlorobinaphthyls, iodoanthracenes, bromoanthracenes, chloroanthracenes, diiodoanthracenes, dibromoanthracenes, dichloroanthracenes, and the like. Also useful are the aryl polyhalides where the haloaryl moiety is an appendage of a linear polymeric backbone. Representative examples of these include the polyiodostyrenes, polybromostyrenes, polychlorostyrenes, and the like.

Photoconductive substances of the invention can be represented by the following general formula:

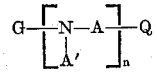

wherein A represents a mononuclear or polynuclear divalent aromatic radical either fused or linear (e.g., phenyl, naphthyl, biphenyl, binaphthyl, etc.), or a substituted divalent aromatic radical of these types wherein said substituent can comprise a member, such as an acyl group having from 1 to about 6 carbon atoms (e.g., acetyl, propionyl, butyryl, etc.), an alkyl group having from 1 to about 6 carbon atoms (e.g., methyl, ethyl, propyl, butyl, etc.), an alkoxy group having from 1 to about 6 carbon atoms (e.g., methoxy, ethoxy, propoxy, pentoxy, etc.), or a nitro group; A' represents a mononuclear or polynuclear monovalent aromatic radical, either fused or linear (e.g., phenyl, naphthyl, biphenyl, etc.); or a substituted monovalent aromatic radical wherein said substituent can comprise a member, such as an acyl group having from 1 to about 6 carbon atoms (e.g., acetyl, propionyl, butyryl, etc.), an alkyl group having from 1 to about 6 carbon atoms (e. g., methyl, ethyl, propyl, butyl, etc.), an alkoxy group having from 1 to about 6 carbon atoms (e.g., methoxy, propoxy, pentoxy, etc.), or a nitro group; Q can represent a hydrogen atom, a halogen atom or an aromatic amino group, such as A'NH—; $n$ represents an integer from 1 to about 12, and G represents a hydrogen atom, a mononuclear or polynuclear aromatic radical, either fused or linear (e.g., phenyl, naphthyl, biphenyl, etc.), a substituted aromatic radical wherein said substituent comprises an alkyl group, an alkoxy group, an acyl group, or a nitro group, or a poly(4-vinylphenyl), such as

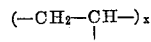
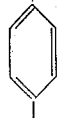

wherein said group is bonded to the nitrogen atom by a carbon atom of the phenyl group, and $x$ represents an integer greater than one.

The polyamines comprising the photoconductive substances of the invention are prepared, as explained previously, by reacting the aromatic amine with an aryl halide. When the halide is an iodide or a bromide, the reactants undergo the desired condensation in an alkaline medium, such as potassium carbonate in nitrobenzene, in the presence of powdered copper catalyst. Such condensations are described in Piccard, J. Am. Chem. Soc., 48, 2882 (1926). When the halide is a chloride, said condensation is more easily effected by heating the reactants under pressure as described in Ber., 32, 1912, 1914 (1899).

Typical photoconductive substances of the invention include polymeric and nonpolymeric compounds although in all instances the substances are polyamino compounds, i.e., they contain two or more amino groups. When the reactants used to form the photoconductive substances of the invention are nonpolymeric and at least one of the reactants is monofunctional, the resulting photoconductive substance is a nonpolymeric material, albeit a polyamino material. For example the condensation of N,N'-diphenylbenzidine with iodobenzene yields the photoconductive N,N,N',N'-tetraphenylbenzidine, a nonpolymeric diamino material:

(1)
$$C_6H_5-NH-C_6H_4-C_6H_4-NH-C_6H_5 + 2I-C_6H_5 \rightarrow$$
$$(C_6H_5)_2N-C_6H_4-C_6H_4-N(C_6H_5)_2$$

When at least one of the reactants is polymeric or when both of the reactants are polyfunctional, the resulting photoconductive substance is a polymeric polyamino material. For example, the condensation of poly(p-iodostyrene), a polymer, with diphenylamine yields poly[N-(4-vinylphenyl)diphenylamine]:

(2) 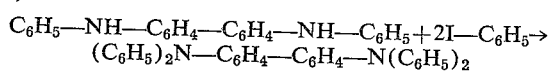

The condensation of the polyfunctional diamine, N,N'-diphenylbenzidine, with the polyfunctional diiodide, p-diiodobenzene, yields the polymer shown below as polymer I:

(3)
$$C_6H_5-NH-C_6H_4-C_6H_4-NH-C_6H_5 + I-C_6H_4-I \longrightarrow$$
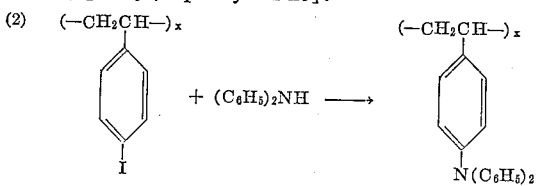 (I)

Other typical photoconductive substances include:

(4) Polymer No. II

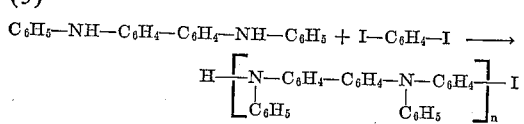

(5) N,N,N',N'-tetraphenyl-p-phenylenediamine $$(C_6H_5)_2N-C_6H_4-N(C_6H_5)_2$$

(6) N,N'-di(1-anthryl)-N,N'-diphenyl-p-phenylenediamine

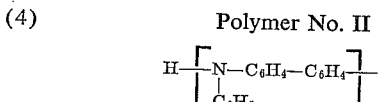

(7) N,N,N',N'-tetraphenyl-1,4-naphthalenediamine $$(C_6H_5)_2N-C_{10}H_6-N(C_6H_5)_2$$

(8) Polymer No. III

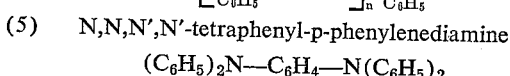

(9) Polymer No. IV

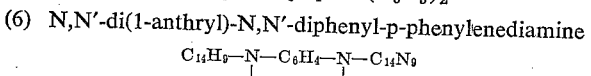

(10) N,N,N',N'-tetraphenyl-m-phenylenediamine

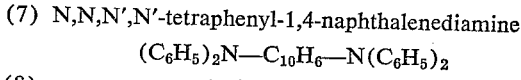

(11) N,N,N',N'-tetra(biphenyl)benzidine $$C_6H_5-C_6H_4-)_2N-C_6H_4-$$
$$C_6H_4-N(-C_6H_4-C_6H_5)_2$$

and the like.

The photoconductive substances of the invention can be employed in a photoconductive layer with or without a binder. The need for a binder depends upon the film-forming properties of the photoconductive substance. For example, with polymeric photoconductive substances of the invention, a binder normally is not required. In these cases, the photoconductor formed is dissolved in a suitable solvent and generally can be coated on a support to form a self-supporting hydrophobic layer. Normally, a chain length of at least 3 units is required to obtain sufficient polymeric characteristics to form the self-supporting layer. The nonpolymeric photoconductive substances of the invention normally require addition of a binder in order to obtain a film-forming coating composition. Preferred binders for use in preparing the photoconductive layers comprise polymers ahving fairly high dielectric strength and which are good electrical insulating film-forming vehicles. Materials of this type comprise styrene-butadiene copolymers; silicone resins; styrene-alkyd resins; silicone-alkyd resins; soya-alkyd resins; poly(vinyl chloride); poly(vinylidene chloride); vinylidene chloride, acrylonitrile copolymers; poly(vinyl acetate); vinyl acetate, vinyl chloride copolymers; polyvinyl acetals, such as poly(vinyl butyral); polyacrylic and methacrylic esters, such as poly(methyl methacrylate), poly(n-butyl methacrylate), poly(isobutyl methacrylate), etc.; polystyrene; nitrated polystyrene; poly(methylstyrene); isobutylene polymers; polyesters, such as poly(ethylenealkaryloxyalkylene terephthalate); phenol-formaldehyde resins; ketone resins; polyamide; polycarbonates; etc. Method of making resins of this type have been described in the prior art, for example, styrene-alkyd resins can be prepared according to the method described in U.S. Patents 2,361,019 and 2,258,423. Suitable resins of the type contemplated for use in the photoconductive layers of the invention are sold under such trade names as Vitel PE-101, Cymac, Piccopale 100, and Saran F-220. Other types of binders which can be used in the photoconductive layers of the invention include such materials as paraffin, mineral waxes, etc.

Solvents of choice for preparing coating compositions of the present invention can include a number of solvents such as benzene, toluene, acetone, 2-butanone, chlorinated hydrocarbons, e.g., methylene chloride, ethylene chloride, etc., ethers, e.g., tetrahydrofuran, or mixtures of these solvents, etc.

In preparing the coating composition useful results were obtained where the photoconductor substance is present in an amount equal to at least about 1 weight percent of the coating composition. The upper limit in the amount of photoconductor substance present is not critical. As indicated previously, the polymeric materials of the present invention in many cases do not require a binder in order to obtain a self-supporting coating on the support. In those cases where a binder is employed, it is normally required that the photoconductor substance be present in an amount from about 1 weight percent of the coating composition to about 99 weight percent of the coating composition. A preferred weight range for the photoconductor substance in the coating composition is from about 10 weight percent to about 60 weight percent.

Coating thicknesses of the photoconductive composition on a support can vary widely. Normally a coating in the range from about 0.001 inch to about 0.01 inch was useful for the invention. The preferred range of coating thickness was found to be in the range from about 0.002 inch to about 0.006 inch.

Suitable supporting materials for coating the photoconductive layers of the present invention can include any of the electrically conducting supports, for example, paper (at a relative humidity above 20 percent); aluminum-paper laminates; metal foils, such as aluminum foil, zinc foil, etc.; metal plates, such as aluminum, copper, zinc, brass, and galvanized plates; regenerated cellulose and cellulose derivatives; certain polyesters, especially polyesters having a thin electroconductive layer (e.g., cuprous iodide) coated thereon; etc. Suitable supporting materials can also include the humidity-independent conducting layers of semiconductors dispersed in polymeric binders, as described in U.S. application Serial No. 56,648, filed September 19, 1960, now abandoned.

The elements of the present invention can be employed in any of the well-known electrophotographic processes which require photoconductive layers. One such process is the xerographic process. In a process of this type, the electrophotographic element is given a blanket electrostatic charge by placing the same under a corona discharge which serves to give a uniform charge to the surface of the photoconductive layer. This charge is retained by the layer owing to the substantial insulating property of the layer, i.e., the low conductivity of the layer in the dark. The electrostatic charge formed on the surface of the photoconducting layer is then selectively dissipated from the surface of the layer by exposure to light through a negative by a conventional exposure operation such as, for example, by contact-printing technique, or by lens projection of an image, etc., to form a latent image in the photoconducting layer. By exposure of the surface in this manner, a charged pattern is created by virtue of the fact that light causes the charge to leak away in proportion to the intensity of the illumination in a particular area. The charge pattern remaining after exposure is then developed, i.e., rendered visible, by treatment with a medium comprising electrostatically attractable particles having optical density. The developing electrostatically attractable particles can be in the form of a dust, i.e., powder, a pigment in a resinous carrier, i.e., toner, or a liquid developer may be used in which the developing particles are carried in an electrically insulating liquid carrier. Methods of development of this type are widely known and have been described in the patent literature in such patents, for example, as U.S. Patent 2,297,691, and in Australian Patent 212,315. In processes of electrophotographic reproduction such as in xerography, by selecting a developing particle which has as one of its components, a low-melting resin, it is possible to treat the developed photoconductive material with heat and cause the powder to adhere permanently to the surface of the photoconductive layer. In other cases, a transfer of the image formed on the photoconductive layer can be made to a second support which would then become the final print. Techniques of the type indicated are well known in the art and have been described in a number of U.S. and foreign patents, such as U.S. Patents 2,297,691 and 2,551,582, and in "RCA Review," vol. 15 (1954), pages 469–484.

The photoconductive layers of the invention can also be sensitized to highly improved speed. Sensitizing compounds for use with the present triphenylamine photoconductive derivatives can include a wide variety of substances, such as pyrylium and thiapyrylium salts of U.S. application Serial No. 146,743, filed October 23, 1961; fluorenes, such as 7,12-dioxo-13-dibenzo(a,h)fluorene, 5,10-dioxo-4a,11-diazabenzo(b)fluorene, 3,13-dioxo-7-oxadibenzo(b,g)fluorene, and the like; aromatic nitro compounds of U.S. Patent 2,610,120; anthrones of U.S. Patent 2,670,285; quinones of U.S. Patent 2,670,286; benzophenones of U.S. Patent 2,670,287; thiazoles of U.S. Patent 2,732,301; mineral acids; carboxylic acids, such as maleic acid, dichloroacetic acid, and salicylic acid; sulfonic and phosphoric acids; and various dyes such as triphenylmethane, diarylmethane, thiazine, azine, oxazine, xanthene, phthalein, acridine, azo, and anthraquinone dyes. The preferred sensitizers of the invention, however, are pyrylium and thiapyrylium salts, fluorenes, carboxylic acids, and the triphenylmethane dyes.

Where a sensitizing compound of the invention is to be used with a photoconductive layer of the invention, it is the usual practice to mix a suitable amount of the sensitizing compound with the coating composition so that, after thorough mixing, the sensitizing compound is uniformly distributed in the coated element. In preparing the photoconducting layers, no sensitizing compound is required to give photoconductivity in the layers which contain the photoconducting substances of the invention, so of course, the lower limit of sensitizer required in a particular photoconductive layer is zero. However, since relatively minor amounts of sensitizing compound gives substantially improvement in speed in such layers, the sensitizer is preferred. The amount of sensitizer that can be added to a photoconductor-incorporating layer to give effective increases in speed can vary widely. The optimum concentration in any given case will vary with the specific photoconductor and sensitizing compound used. In general, substantial speed gains can be obtained where an appropriate sensitizer is added in a concentration range from about 0.0001 to about 30 percent by weight based on the weight of the film-forming hydrophobic coating composition. Normally, a sensitizer is added to the coating composition in an amount by weight from about 0.005 to about 5.0 percent by weight of the total coating composition.

The invention will now be described by reference to the following examples.

*Example 1.—Synthesis of polymer No. I*

A mixture consisting of 3.36 g. (0.01 mole) of N,N'-diphenylbenzidine, 3.29 g. (0.01 mole) of p-diiodobenzene, 5 g. of potassium carbonate, 0.1 g. of copper powder and 150 ml. of nitrobenzene was heated at incipient reflux while stirring for 8 hours. After cooling, the mixture was filtered. The filtrate was concentrated and 2.5 g. polymeric product was isolated by precipitation into methanol. The product was purified by chromatography. Using a 1-inch by 12-inch column of alumina, the polymeric product was applied in toluene and 1.8 g. was eluted with dichloromethane. Elementary analysis indicated that the chain length of the polymeric product was eight units.

Analytical calculation for $C_{120}H_{89}N_8I$: C, 80.4; H, 5.1; N, 6.3; I, 7.2. Found: C, 80.2; H, 6.0; N, 6.1; I, 8.0.

*Example 2.—Synthesis of N,N,N',N'-tetraphenylbenzidine*

A mixture consisting of 6.72 g. (0.02 mole) of N,N'-diphenylbenzidine, 20.4 g. (0.1 mole) of iodobenzene, 4 g. of potassium carbonate, 0.1 g. of copper powder, and 200 ml. of nitrobenzene was heated at incipient reflux for 8 hours while stirring. The mixture was filtered and the nitrobenzene was steam distilled from the filtrate. The residue was dissolved in toluene, the solution dried, and solvent removed. The crude residue (9 g.) was crystallized from isopropyl alcohol. The first fraction to separate had a melting point of 220–222° C.

Analytical calculation for $C_{36}H_{28}N_2$: C, 88.6; H, 5.7; N, 5.7. Found: C, 88.9; H, 5.7; N, 5.4.

*Example 3.—Synthesis of N,N,N',N'-tetraphenyl-p-phenylenediamine*

A mixture consisting of 6.6 g. (0.02 mole) of p-diiodobenzene, 16.9 g. (0.1 mole) of diphenylamine, 4 g. of potassium carbonate, 0.1 g. of copper powder, and 200 ml. of nitrobenzene was heated at incipient reflux for 8 hours while stirring. The resulting mixture was cooled, filtered, and the nitrobenzene steam distilled from the filtrate. The residue was dissolved in toluene, the solution dried, and the solvent removed. Crystallization of the residue from isopropyl alcohol-water resulted in the separation of fractions having a melting point of 165–167° C. and 177–180° C. Crystallization of the remaining materials from ether resulted in 5 g. of material (M.P. 187–188°) which corresponded to the following product.

Analytical calculation for $C_{30}H_{24}N_2$: C, 87.4; H, 5.8; N, 6.8. Found: C, 85.7; H, 5.7; N, 6.8.

Similarly N,N,N',N'-tetraphenyl-m-phenylenediamine is obtained from condensing m-diiodobenzene and diphenylamine.

*Example 4.—Synthesis of poly[N-(4-vinylphenyl)diphenylamine]*

A mixture of 9.2 grams (0.04 mole) of poly-p-iodostyrene, 8.2 grams (0.049 mole) of diphenylamine, 5.5 grams (0.040 mole) of powdered potassium carbonate, and 0.1 gram of copper powder in 150 ml. of nitrobenzene was stirred and heated at the boiling point for 16 hours. Water distilled and was collected as it formed. The mixture was cooled and filtered. The filtrate was treated with activated charcoal and precipitated into methanol. After washing in methanol and then acetone and drying, 10.2 g. of polymer was obtained. The product was soluble in methylene chloride, dichloropropane, toluene, benzene and similar solvents.

Analytical calculation for $C_{20}H_{17}N$: N, 5.2. Found: N, 4.6.

*Example 5.—Synthesis of poly[N-(4-vinylphenyl)-α,α'-dinaphthylamine]*

The preparation of poly-N-(4-vinylphenyl)-α,α'-dinaphthylamine was carried out as described in Example 4 except that 11.8 grams (0.044 mole) of α,α'-dinaphthylamine was used instead of diphenylamine. The polymer was precipitated into acetone; and after washing and drying, 11.0 grams of polymer was isolated. The product was soluble in 1,2-dichloropropane, toluene and similar solvents.

Analytical calculation for $C_{28}H_{21}N$: N, 3.8. Found: N, 3.8.

*Example 6*

This example shows the relative photoelectric sensitivity obtained in electrophotographic elements of the invention where the present photoconductive substances are incorporated in the photoconductive layers of such elements. In preparing the elements, the photoconductive layer was coated in a well known manner on an electrically conducting support such as aluminum foil.

Coatings in this example were prepared by dissolving 0.5 g. of the photoconductor substance in a solution of 2.0 g. of polyester binder in 15 ml. of tetrahydrofuran. The polyester is a copolymer of terephthalic acid and a glycol mixture comprising a 9:1 wt. ratio of 2,2-bis[4-(β-hydroxyethoxy)phenyl]propane and ethylene glycol. To the resulting dope was added 0.5 ml. of a tetrahydrofuran solution containing 0.025 g. of 2,6-bis(4-ethylphenyl)-4-(4-amyloxyphenyl)-thiapyrylium perchlorate. This composition was then coated on the conducting support (aluminum foil) at a wet thickness of 0.004 inch, dried and given a charge under a negative corona in a well known manner. The charged layer was then exposed through a 0.16 log E step tablet to light from a 300 w. tungsten source at 9 inches for 30 seconds, and developed by treatment with a particulate electrostatically attractable toning developer as described in U.S. Patent 2,297,691.

The electrophotographic results using each of these groups of elements is given in the following table.

TABLE I

| Photoconductive substance: | Visible steps |
|---|---|
| Polymer No. I | 6 |
| N,N,N',N'-tetraphenylbenzidine | 18 |
| N,N,N',N'-tetraphenyl-p-phenylenediamine | 19 |
| N,N,N',N'-tetraphenyl-m-phenylenediamine | 14 |
| Poly[N-(4-vinylphenyl)diphenylamine] | 24 |
| Poly[N-(4-vinylphenyl)-α,α'-dinaphthylamine] | 5 |

The use of the present polyamine photoconducting substances in preparing electrophotographic elements have a number of advantages. Not only do the present substances yield electrophotographic images when used in photoconducting layers, even without a sensitizing compound present, but they also respond to sensitizing compounds so that greatly improved speeds can be obtained. Coatings prepared using the present polyamine substances, which are relatively high molecular weight substances, have the added advantage over many other amines, such as triphenylamine, of having low volatility, and, for this reason, an improved permanence in storage stability is obtained. This is an important feature when some time is expected to elapse between the time that the electrophotographic element is prepared and the time it is to be used in an electrophotographic process. The stability of coatings is of paramount importance in any process where the electrophotographic element becomes the final print rather than being used incidentally in a transfer process. The present photoconductive polyamine substances are readily soluble in a number of solvents, and coatings prepared with these compounds were not troubled by crystallization after a storage period.

The invention has been described in detail with particular reference to preferred embodiments thereof but it will be understood that variations and modifications can be effected within the spirit and scope of the invention as described hereinabove and as defined in the appended claims.

I claim:
1. An electrophotographic element comprising an electrically conducting support having coated thereon a photoconductive composition containing as the photoconductive substance thereof, a polyfunctional tertiary amine selected from the group consisting of
   (A) polytriphenylamines consisting essentially of recurring monomeric units having the formula:

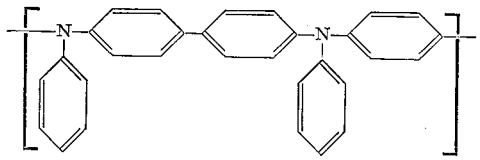

(B) poly-p-aminostyrenes consisting essentially of recurring monomeric units having the formula:

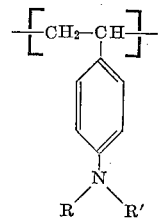

wherein R and R' are selected from aryl radicals;
   (C) N,N,N',N'-tetraphenybenzidines; and
   (D) N,N,N',N'-tetraphenylphenylenediamines.

2. The element of claim 1 wherein said photoconductive substance is N,N,N',N'-tetraphenylbenzidine.

3. The element of claim 1 wherein said photoconductive substance is N,N,N',N'-tetraphenyl-p-phenylenediamine.

4. The element of claim 1 wherein said photoconductive substance is N,N,N',N'-tetraphenyl-m-phenylenediamine.

5. The element of claim 1 wherein said photoconductive substance has the formula:

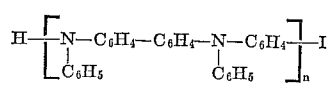

wherein $n$ is an integer greater than 2.

6. The element of claim 1 wherein said photoconductive substance is poly[N-(4-vinylphenyl)diphenylamine].

7. The element of claim 1 wherein said photoconductive substance is poly[N-(4-vinylphenyl)α,α'-dinaphthylamine].

8. In the art of electrophotographic reproduction, the process comprising (a) charging by ion discharge an electrophotographic material comprising an electrically conducting support having a photoconductive layer coated thereon, (b) exposing said layer to pattern illumination to result in a differentially charged pattern in said layer, and (c) developing said layer with an electrostatically attractable particulate material having optical density to produce an image corresponding to said pattern illumination, said photoconductive layer containing as the photoconductive substance thereof, a polyfunctional tertiary amine selected from the group consisting of (A) polytriphenylamines consisting essentially of recurring monomeric units having the formula:

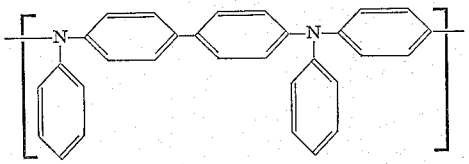

(B) poly-p-aminostyrenes consisting essentially of recurring monomeric units having the formula:

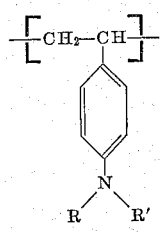

wherein R and R' are selected from aryl radicals;
(C) N,N,N',N'-tetraphenylbenzidines; and
(D) N,N,N',N'-tetraphenylphenylenediamines.

9. The process of claim 8 wherein said photoconductive substance is N,N,N',N'-tetraphenylbenzidine.

10. The process of claim 8 wherein said photoconductive substance is N,N,N',N'-tetraphenyl-p-phenylenediamine.

11. The process of claim 8 wherein said photoconductive substance is N,N,N',N'-teteraphenyl-m-phenylenediamine.

12. The process of claim 8 wherein said photoconductive substance has the formula

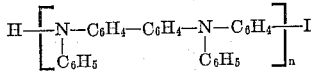

wherein $n$ is an integer greater than 2.

13. The process of claim 8 wherein said photoconductive substance is poly[N-(4-vinylphenyl)diphenylenediamine].

14. The process of claim 8 wherein said photoconductive substance is poly[N-(4-vinylphenyl)-α,α'-dinaphthylamine].

References Cited by the Examiner

UNITED STATES PATENTS 2,663,636   12/1953   Middleton _____ 96—1
2,692,178   10/1954   Grandalam _____ 96—1
3,072,479   1/1963    Bethe _____ 96—1

FOREIGN PATENTS 562,336     5/1958    Belgium.
1,110,518   7/1961    Germany.

OTHER REFERENCES

Vartanian, Acta Physoichimica U.R.S.S., vol. XXII, No. 2, pages 201, 224 (1947).

Rumpf, Chem. Abstracts, vol. 36, cols. 2852–2853 (1942).

NORMAN G. TORCHIN, *Primary Examiner.*